Figure 1:
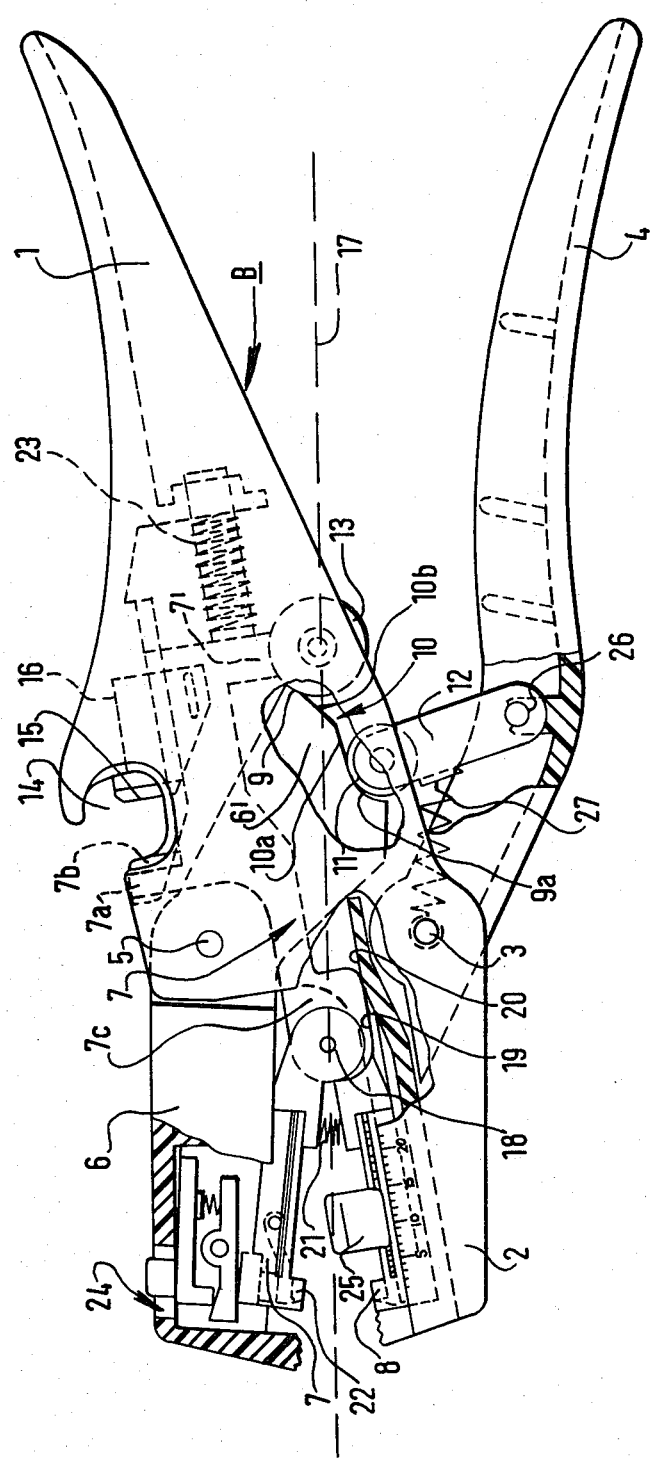

United States Patent [19]

Schulze

[11] 4,407,174
[45] Oct. 4, 1983

[54] TOOL FOR STRIPPING ELECTRICAL CONDUCTORS

[75] Inventor: Rainer Schulze, Detmold, Fed. Rep. of Germany

[73] Assignee: C. A. Weidmuller GmbH & Co., Detmold, Fed. Rep. of Germany

[21] Appl. No.: 267,987

[22] Filed: May 28, 1981

[30] Foreign Application Priority Data

Jun. 7, 1980 [DE] Fed. Rep. of Germany ... 8015246[U]

[51] Int. Cl.³ .............................................. H02G 1/12
[52] U.S. Cl. ................................................... 81/9.5 A
[58] Field of Search ............................ 81/9.5 R, 9.5 A

[56] References Cited

U.S. PATENT DOCUMENTS 3,915,037 10/1975 Wiener ............................... 81/9.5 A
4,112,791 9/1978 Wiener ............................... 81/9.5 A
4,197,768 4/1980 Undin ................................. 81/9.5 A Primary Examiner—James G. Smith
Attorney, Agent, or Firm—Pollock, Vande Sande & Priddy

[57] ABSTRACT

Wire-stripping pliers have outer clamping jaws and inner longitudinally movable stripping jaws. The stripping jaws are retracted, and the movable blade of a wire cutter is moved, by a pulling member in response to closure of the pliers handles. This movement is produced by a driving arm which moves along a cam surface on an extension of the pivoted clamping jaw, thereby pushing back the pulling member. The cam surface has a first portion of shallow inclination to provide rapid movement of the stripping jaws at low force, followed by a surface portion of steep inclination providing for relatively high cutting forces as the wire cutting blades close.

6 Claims, 2 Drawing Figures

TOOL FOR STRIPPING ELECTRICAL CONDUCTORS

This invention relates to tools for stripping insulation from the ends of electrical conductors, in particular, wire stripping pliers.

The invention concerns stripping tools of the kind disclosed in U.S. Pat. Nos. 3,915,037 and 4,112,791, and British Patent Specification Nos. 148808 and 1,564,199. In such tools, a pair of clamping jaws, and a pair of stripping jaws mounted for longitudinal movement in the clamping jaws, are operated by a driving arm which engages a cam surface on an extension of one of the clamping jaws. Sliding movement of the stripping jaws, to remove insulation cut by these jaws, is produced by engagement of the driving arm with a pulling means as the driving arm moves along the jawoperating cam surface. The pulling means also operates a movable blade of a cable cutter. During operation of the pulling means, the driving arm moves along the cam surface. In the known tools, the cam surface is rectilinear. Consequently, the force transmission ratio, between the actuating force applied to the operating member of the tool and the force exerted by the driving arm on the pulling member, is substantially uniform throughout the movement of the pulling member. The force transmission ratio is therefore substantially the same during closure of the blades of the cutter, as it is during the longitudinal movement of the stripping jaws for stripping the insulation. This, however, is a severe disadvantage, because in practice the force necessary for cutting a conductor or conductor core is substantially greater than the force needed to pull the insulation from a conductor. As the stripping jaws must be made to move a sufficient distance to strip the insulation, the inclination of the cam surface relative to the longitudinal center axis of the tool must be relatively shallow, and this means that the force transmission ratio is low, and it is difficult to apply enough force for cutting conductors.

An object of the present invention is to provide a tool for stripping insulation from conductors and for cutting conductors, in which optimum force transmission ratios are provided both for the stripping operation and for the cutting operation.

According to the present invention, the cam surface has a first portion which extends at a relatively shallow angle, for example about 15°, to the longitudinal center axis of the tool and is engaged by the free end of the driving arm during the initial operating movement of the tool, i.e., during the clamping and insulation-stripping operation of the clamping and stripping jaws; and the cam surface has a second portion which is engaged by the free end of the driving arm during the final part of the operating movement of the tool, i.e., during the final approach and closure of the conductor-cutting blades, this second portion extending at a relatively steep angle to the said longitudinal center axis of the tool, for example, at about 45°.

This arrangement provides a variable force transmission ratio between the driving arm and the pulling means during operation of the tool. Initially, only relatively small forces are applied to the jaws and the pulling means, sufficient to clamp the conductor and cut its insulation and to strip the insulation, while the amplitude of longitudinal movement of the pulling means is relatively large for effective stripping. During further operating movement of the tool, the second cam surface portion comes into play and the ratio of force transmission to the pulling means is increased according to the greater inclination of the second cam surface portion, so that during closure of the cutting blades for cutting a conductor core, substantially greater forces can be applied to the pulling means, with a correspondingly reduced amplitude of movement of the pulling means and hence of the cutting blades. Thus, by application of a normal amount of effort, the user initially produces a stripping operation using relatively small forces, while the same effort can produce substantially higher forces for the cutting operation.

Because very substantial forces are produced within the tool during cutting, by the application of a normal effort by the user, and because these forces are transmitted through the pulling means and can also be transmitted from the latter to the pivot connection between the stripping jaws and the pulling means, the tool is preferably designed so that the cutting forces are transmitted, not to the stripping jaw pivot but directly from the pulling means to the body of the tool. Preferably, cooperating supporting slide surfaces are provided on a front region of the pulling means adjacent to the stripping jaw pivot, and in an adjoining region of the main body.

Since the stripping jaw pivot is relieved of the forces arising during cutting, it is possible to use a very simple, cheap and easily assembled construction for the stripping jaws and their pivot connection to the pulling means. In particular, the connection may comprise a pivot pin on one stripping jaw, engaging corresponding apertures in the pulling means and the other stripping jaw. The stripping jaws can be molded of plastic material, with said pivot pin integral with the jaw body. Assembly simply involves fitting the pivot pin through the aperture in the pulling means, and then fitting the aperture of the second stripping jaw over the projecting end of the pivot pin.

Figure 2:
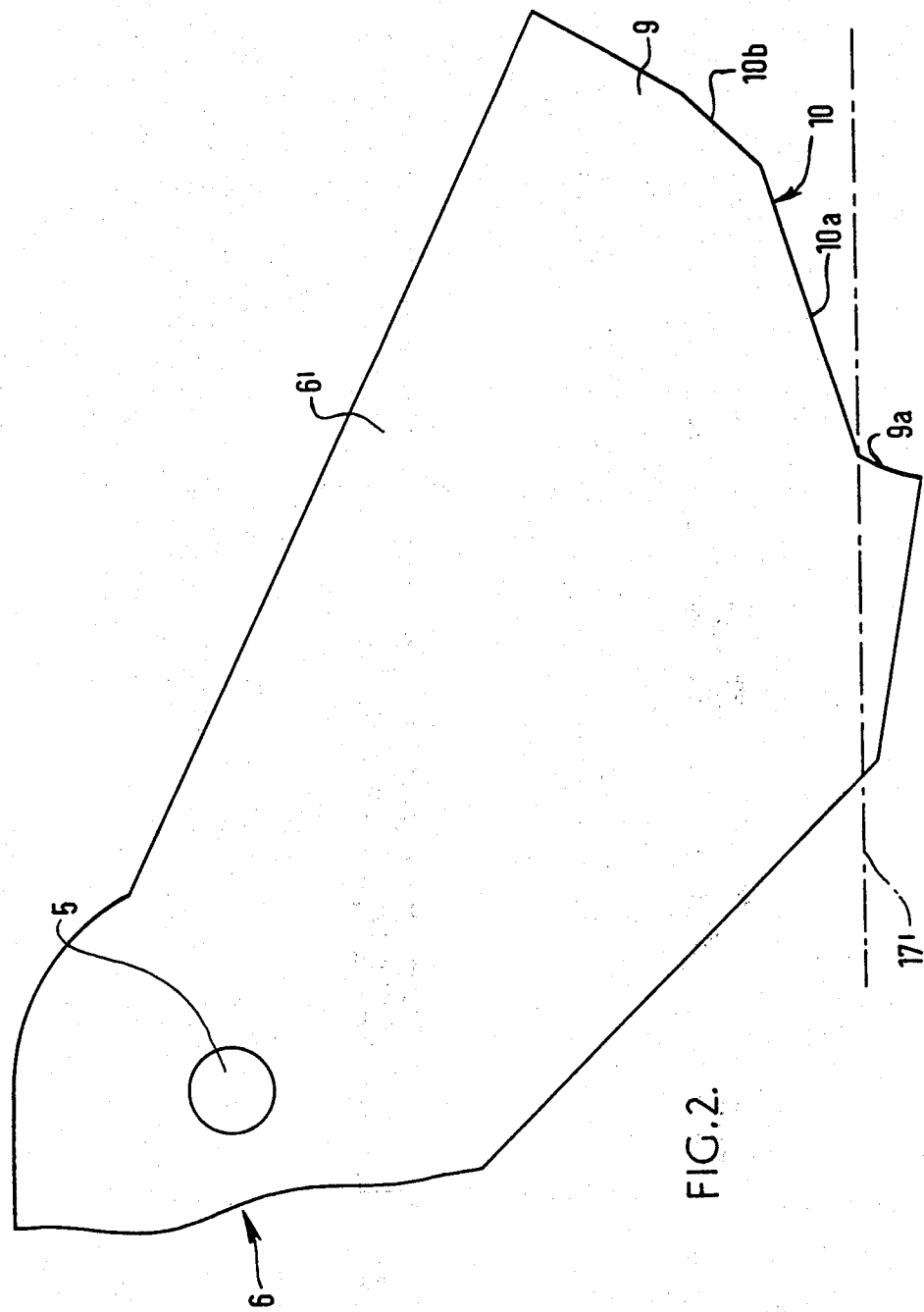

The invention will be further described with reference to the accompanying drawings, in which:

FIG. 1 is a side view of stripping pliers embodying the invention, partly cut away, and FIG. 2 shows the operating cam surface of the pliers on a larger scale.

The illustrated pliers have an integral main body B of substantially U-section, made of plastic material and incorporating a handle 1 and a clamping jaw 2. A second handle 4 is pivoted in the main body by a pivot pin 3, and a second clamping jaw 6 is pivoted in the main body by a pivot pin 5. Between the clamping jaws is a pair of stripping jaws 7, 8 pivotably interconnected by a pivot pin 18. Each stripping jaw can slide longitudinally in the associated clamping jaw. The stripping jaws are provided with insulation-cutting means 22. The stripping jaws are normally urged apart by a spring 21. The stripping jaws are connected by the pivot pin 18 to a pulling member 7 mounted for longitudinal sliding in the main body member B and normally urged forwards by a spring 23. The main body member has integrally molded seating and guiding means for the pulling member 7 and spring 23, as shown in broken lines in FIG. 1.

In operation, when the handles 1, 4 are moved towards one another, the clamping jaws 2, 6 are closed, thereby causing the stripping jaws 7, 8 to close. The clamping jaws grip an insulated conductor previously inserted between them, and the cutting means 22 of the stripping jaws cut the insulation on the conductor. The tips of the clamping jaws have serrations for gripping the conductor insulation. Further closing movement of the handles causes the pulling member 7 to be retracted into the main body B, thereby longitudinally retracting the closed stripping jaws so that these pull the cut insulation off the clamped conductor.

The clamping jaw 6 contains a device 24 for adjusting the cutting depth of the associated stripping jaw 7. The other stripping jaw 8 carries an adjustable stop 25 against which the end of the conductor is placed to define the length of insulation to be stripped from it.

The pulling member 7 is provided with a projection 7a on one edge of which is a cutting edge 7b, thereby forming a movable cutting blade which moves with the stripping jaws as the pliers handles are closed. The cutting edge 7b faces a cutting edge 15 of a fixed blade 16 mounted in the handle 1. The fixed blade 16 can be suitably shaped and placed to act as a guide for the sliding movement of the pulling member 7. The fixed and moving blades form a cutter for cutting a conductor, or a stripped conductor core, to a desired length. For safety, the blades are at opposite sides of a recess 14 in the main body, and the moving blade moves across this recess to cut a conductor inserted in the recess. The closing, cutting movement of the movable blade takes place at the end of the stripping movement of the stripping jaws.

The described operation of the pliers is produced by a mechanism generally as described in the previously mentioned prior patent specifications. The pivoted jaw 6 has an angled extension 6' beyond its pivot pin 5, with a cam surface 10 at the free end of the extension. A driving arm 12 has one end pivoted in the handle 4 on a pivot pin 26, and the other end of the arm 12 carries a roller 11 which rests against the cam surface 10. The arm 12 is pulled counter-clockwise (in FIG. 1) by a spring 27 attached to the pivot pin 3, to hold the roller against the cam surface. At the rear end of the pulling member 7 is a projecting arm 7' on the end of which is a roller 13 adjacent to the rearmost portion of the cams surface 10. At the forward end of the cam surface is an end stop 9a against which the roller 11 is normally held by the spring 27. At the rear end of the cam surface is an end stop surface 9 (best shown in FIG. 2).

When the handles 1, 4 are closed, initially the roller 11 pushes against the cam surface 10 at the end stop 9a, thereby pivoting the clamping jaw 6 until the clamping jaws and stripping jaws are closed. As the jaws reach their closed positions, the roller 11 comes into contact with the roller 13. On further closing movement of the handles, because the jaw 6 can move no further the roller 11 moves along the cam surface 10, pushing backwards the roller 13 and hence the pulling member 7, and thereby retracting the stripping jaws within the clamping jaws. At the same time the movable cutting blade moves towards the fixed blade.

The cam surface 10 has a first portion 10a adjacent to the forward end stop 9a.

The relation between the movement of the pulling member 7 and the movement of the handle 4 is governed by the shape of the cam surface along which the roller 11 moves, and in particular by the angle of inclination of the cam surface relative to the imaginary longitudinal center axis 17 of the pliers, or to a line 17' parallel to the said axis. If the angle between the cam surface and the said axis is shallow, a given movement of the handle will produce a relatively large movement of the roller 11 and the pulling member 7. A larger angle leads to a smaller ratio between the movement of the pulling member 7 and the movement of the handle 4. Correspondingly, the greater the angle of the cam surface, the greater the ratio with which force is transmitted from the handle to the pulling member.

The first portion 10a of the cam surface is at a small angle of inclination to the central axis of the pliers, preferably about 15°. The cam roller 11 runs on this cam surface portion during the stripping movement of the stripping jaws and initial approach movement of the cutting blades. The force transmission ratio is such that, for a normal effort applied to the handles, only relatively small clamping, cutting and stripping forces are applied to the jaws.

Adjacent to the cam surface portion 10a is a second cam surface portion 10b at a much steeper angle, about 45°, to the longitudinal axis 17 of the pliers. The roller 11 moves onto this second cam surface portion as the movable blade approaches the fixed blade, towards the end of the insulation-stripping movement of the jaws. Because of the steep angle of inclination of the second cam surface portion 10b, a given movement of the handle 4 produces a relatively small movement of the cutting blades and correspondingly a normal effort applied to the handles produces a relatively large cutting force at the cutting blades. Consequently even thick conductor cores can be cut without the application of excessive effort to the handles. It will be seen that the mechanism described provides a rapid initial approach of the cutting blades followed by a slow movement and force magnification during the cutting operation.

The rear end stop 9 is adjacent to the second cam surface portion 10b. It is shaped to allow the jaw 6 to pivot freely after the roller 11 has moved clear of the end of the cam surface portion 10b, so that the clamping jaws and the stripping jaws can open under the influence of the spring 21, for easy removal of the stripped conductor. The spring 21 also maintains the cam surface in contact with the roller 11.

The large forces which may arise during cutting are also transmitted to the forward part of the pulling member 7. To prevent such large forces from being applied to the stripping jaw pivot pin 18, the forward end region 7c of the pulling member 7 is provided with a supporting slide surface 19 which rests on a corresponding supporting slide surface 20 provided in the main body at the rear of the clamping jaw 2, so that at least during the cutting movement, the surface 19 slides along the surface 20 and the forces arising from cutting, which may be large, and thereby transmitted directly to the main body B of the pliers.

Because the stripping jaw pivot is not subjected to large forces, a simple, cheap and easily assembled construction can be used. Specifically, the pivot pin 18 is formed integrally at the rear end of one of the stripping jaws (made of molded plastic material). The integral pin 18 is inserted through a corresponding aperture (not shown) in the front portion 7c of the pulling member 7 so as to project from the latter, and the second stripping jaw has at its rear end a corresponding aperture, which is fitted over the end of the pivot pin projecting through the pulling member 7.

I claim:

1. A tool for stripping the sheathing from sheathed conductors, comprising
   (a) a pair of articulated clamping jaws for holding an end of a sheathed conductor during stripping operations, a first of said clamping jaws being provided on a main body to which the second of said clamping jaws is pivotably connected, said pivotable clamping jaw having a portion extending backwards from the pivot point and provided at its rear extremity with a cam surface;

(b) a pair of longitudinally movable, articulated stripping jaws adjacent the inner sides of said clamping jaws, said stripping jaws having cutting edges for cutting into said sheathing and for stripping said sheathing from said conductors;

(c) pulling means on said main body connected to said stripping jaws for pulling said stripping jaws in a direction longitudinal to a conductor held in said clamping jaws;

(d) cutting means in said main body comprising a movable blade operable by said pulling means;

(e) a member pivotably connected by one end thereof to said main body and extending longitudinally backward away from said clamping jaws;

(f) a driving arm pivoted at one end thereof to said member, the free end of said driving arm engaging said cam surface on said pivotable clamping jaw; and (g) a projecting member on said pulling means adjacent said cam surface, so located that when said main body and said pivoted member are urged together, the free end of said driving arm first moves along said cam surface to simultaneously close said articulated clamping jaws and said stripping jaws and then engages said projecting member on said pulling means to pull said cutting jaws in a longitudinal direction to strip said sheathing from the end of a conductor held by said clamping jaws and to move said movable blade;

(h) said cam surface comprising:
 (i) a first cam surface portion arranged to be engaged by said driving arm during stripping of said sheathing, said first cam surface portion being at a relatively shallow angle to the longitudinal center axis of said tool; and
 (ii) a second cam surface portion arranged to be engaged by said driving arm during cutting movement of said movable blade, said second cam surface portion being at a relatively steep angle to said longitudinal center axis and extending at an angle to the longitudinal axis of said driving arm in every position of said clamping jaws and said stripping jaws.

2. A tool according to claim 1, wherein said cam surface further comprises a first end stop at a first end thereof defining the fully open position of said jaws, and a second end stop at the end of said cam surface remote from said first end, defining an end position for said driving arm when said main body and said pivotable member are urged maximally together, wherein said jaws re-open and said pulling means are fully retracted, said first and second cam surface portions being adjacent to said first and second end stops, respectively.

3. A tool according to claim 1, wherein said first cam surface portion is at about 15° to said axis and said second cam surface portion is at about 45° to said axis.

4. A tool according to claim 1, wherein said pulling means has, in a forward region thereof adjacent to said jaws, a first supporting slide surface, and said main body has a second supporting slide surface thereon adjacent to and slidably supporting the said first supporting slide surface of the pulling means.

5. A tool according to claim 4, wherein said forward region of said pulling means has a first transverse aperture, one of said stripping jaws has at its rear end a second transverse aperture, and the other of said stripping jaws has at its rear end a transverse pivot pin which is inserted in said first and second transverse apertures, thereby pivotably interconnecting said stripping jaws and said pulling means.

6. A tool according to any one of claims 1 to 5, in the form of stripping pliers, wherein said main body and said pivotable member form respective handles.

* * * * *